(12) United States Patent
Edwards et al.

(10) Patent No.: US 11,394,067 B2
(45) Date of Patent: Jul. 19, 2022

(54) BATTERY, BATTERY ENCLOSURE AND VEHICLE

(71) Applicant: Farasis Energy (Ganzhou) Co., Ltd., Ganzhou (CN)

(72) Inventors: Jackson Edwards, Moscow, ID (US); Andrew Larson, Livermore, CA (US); Benjamin Zeiger, Boulder, CO (US)

(73) Assignee: FARASIS ENERGY (GANZHOU) CO., LTD., Ganzhou (CN)

( * ) Notice: Subject to any disclaimer, the term of this patent is extended or adjusted under 35 U.S.C. 154(b) by 155 days.

(21) Appl. No.: 16/864,932

(22) Filed: May 1, 2020

(65) Prior Publication Data
US 2020/0350531 A1 Nov. 5, 2020

Related U.S. Application Data

(60) Provisional application No. 62/842,761, filed on May 3, 2019.

(51) Int. Cl.
| | | |
|---|---|---|
| *H01M 10/658* | (2014.01) | |
| *H01M 50/24* | (2021.01) | |
| *H01M 50/30* | (2021.01) | |
| *H01M 10/625* | (2014.01) | |
| *H01M 50/211* | (2021.01) | |
| *H01M 50/249* | (2021.01) | |
| *H01M 50/392* | (2021.01) | |

(52) U.S. Cl.
CPC ....... *H01M 10/658* (2015.04); *H01M 10/625* (2015.04); *H01M 50/211* (2021.01); *H01M 50/24* (2021.01); *H01M 50/249* (2021.01); *H01M 50/30* (2021.01); *H01M 50/392* (2021.01); *H01M 2220/20* (2013.01)

(58) Field of Classification Search
None
See application file for complete search history.

(56) References Cited

U.S. PATENT DOCUMENTS

| 4,394,423 A * | 7/1983 | Ledjeff | H01M 50/392 |
| | | | 429/86 |
| 2010/0136404 A1* | 6/2010 | Hermann | H01M 10/6557 |
| | | | 429/120 |

(Continued)

*Primary Examiner* — Gregg Cantelmo
(74) *Attorney, Agent, or Firm* — Volpe Koenig

(57) ABSTRACT

The present disclosure relates to the technical field of battery system, and discloses a battery, a battery enclosure and a vehicle, wherein the battery comprises a battery enclosure defining a receiving space; a thermal isolation panel disposed in the receiving space and dividing the receiving space into a plurality of subspaces; and a plurality of cells respectively arranged in the subspaces and divided into a plurality of groups by the thermal isolation panel; wherein a weakened zone for guiding energy release when thermal runaway occurs in the cells is formed on an enclosure wall of the battery enclosure adjacent to the cell. The cells of the battery are separated by the thermal isolation panel so as to prevent the thermal runaway events from rapid spreading in the battery. At the same time, by providing a weakened zone on the battery enclosure wall adjoining the cell, an optimal venting direction can be provided for the cell in case of a thermal runaway, thus the battery has high safety.

9 Claims, 1 Drawing Sheet

(56) References Cited

U.S. PATENT DOCUMENTS

| | | | | |
|---|---|---|---|---|
| 2010/0273034 A1* | 10/2010 | Hermann | ............ | B60K 1/04 |
| | | | | 429/62 |
| 2012/0070703 A1* | 3/2012 | Wahl | ............ | H01M 50/35 |
| | | | | 429/53 |
| 2012/0100421 A1* | 4/2012 | Oda | ............ | H01M 50/112 |
| | | | | 429/185 |
| 2012/0208052 A1* | 8/2012 | Kim | ............ | H01M 50/211 |
| | | | | 429/82 |

* cited by examiner

BATTERY, BATTERY ENCLOSURE AND VEHICLE

CROSS REFERENCE TO RELATED APPLICATION

This application claims the benefit of the U.S. provisional patent application No. 62/842,761, filed on May 3, 2019, entitled "Redirection of battery runaway events," the content of the provisional patent application is specifically and entirely incorporated herein by reference.

FIELD

The present disclosure relates to a battery system, in particular to a battery enclosure capable of guiding a redirection and release of energy of a cell in the thermal runaway events and a battery comprising the battery enclosure. The present disclosure further relates to a vehicle comprising the battery.

BACKGROUND

The news in regard to firing and smoking of the electric vehicles (EVs) cause the consumers to perceive that the safety of EVs is poor, such a perception is adverse to the popularization and application of the new energy technologies. The spontaneous combustion accident of an electric vehicle is usually caused by a power battery, for example, the power battery may result in thermal runaway events because of factors such as increased internal resistance, lithium metal deposition caused by improper use, impact from foreign object, it then causes burning of the vehicle.

In the thermal runaway events, the energy generated from a initially failed cell rapidly propagates toward adjacent cells, which in turn triggers a chain reaction, causing the whole battery system to ignite, burn or explode. How to improve the safety of the battery is a key problem faced by those skilled in the relevant technical field.

SUMMARY

The present disclosure aims to overcome the safety defects in the prior art caused by the thermal runaway events of a battery system, and provides a battery which can prevent propagation of the thermal runaway and has high safety in use.

In order to achieve the above object, a first aspect of the present disclosure provides a battery comprising: a battery enclosure defining a receiving space; a thermal isolation panel disposed in the receiving space and dividing the receiving space into a plurality of subspaces; and a plurality of cells respectively arranged in the subspaces and divided into a plurality of groups by the thermal isolation panel. Wherein a weakened zone for guiding energy release when thermal runaway occurs in the cells is formed on an enclosure wall of the battery enclosure adjacent to the cell.

A second aspect of the present disclosure provides a battery enclosure for use in the aforementioned battery, wherein the battery enclosure having a weakened zone formed on an enclosure wall for adjoining the cell.

A third aspect of the present disclosure provides a vehicle comprising the aforementioned battery.

Through the above technical scheme, the cells are separated by the thermal isolation panel so as to prevent the thermal runaway events from rapid spreading in the battery. At the same time, by providing a weakened zone on the battery enclosure wall adjoining the cell, an optimal venting direction can be provided for the cell in case of a thermal runaway, which not only can guide the energy of cells in thermal runaway to be directed away from the adjacent cell, thereby preventing propagation of the thermal runaway; but also improve safety of the battery by directing the fire and hot gases away from other battery components and passengers/users.

DESCRIPTION OF REFERENCE SIGNS 4 thermal isolation panel
5 cell
6 weakened zone
7 battery enclosure

DETAILED DESCRIPTION

The following content describes the specific embodiments of the present disclosure in detail with reference to the accompanying drawings. It should be comprehended that the specific embodiments described herein merely serve to illustrate and explain the present disclosure, instead of limiting thereto.

Unless otherwise specified, the directional terms used in the present disclosure, such as "upper, lower, left, and right" generally refer to the upper, lower, left, and right directions shown in the reference drawings; "inner and outer" refer to the inside and outside relative to the profile of the component per se.

Figure 1:
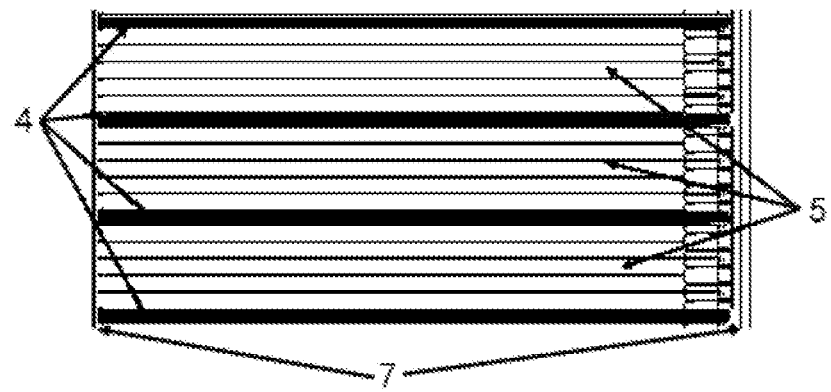
FIG. 1 illustrates a schematic sectional view of a battery according to a preferred embodiment of the present disclosure.

Referring to FIG. 1, a battery according to a preferred embodiment of the present disclosure includes a battery enclosure 7, a thermal isolation panel 4, and a plurality of cells 5. Wherein the battery enclosure 7 defines a receiving space for mounting the cells 5, and the thermal isolation panel 4 and the plurality of cells 5 are respectively disposed in the receiving space.

In this embodiment, every five cells 5 are grouped into a group, and a total of three groups are shown in FIG. 1. The thermal isolation panels 4 are arranged in parallel with the cells 5, and sandwich each group of cells 5 between a pair of thermal isolation panels 4, thereby preventing the energy of the cell 5 in thermal runaway event from being rapidly propagated to the adjacent cells 5 when a thermal runaway event occurs. That is, the thermal isolation panels 4 divide the receiving space defined by the battery enclosure 7 into a plurality of subspaces, each subspace has a group of cells disposed therein, and two adjacent sets of cells are separated by the thermal isolation panels 4, thereby enabling to prevent energy propagation in case of the thermal runaway event.

It should be understood that it is not required that five or other number of the plurality of cells 5 are arranged in each of the subspaces formed by the receiving spaces of the battery enclosure 7 partitioned by the thermal isolation panels 4, and the battery of the present disclosure may be that only one cell 5 is disposed in each sub-space under a circumstance of ignoring factors such as cost and structural complexity. Furthermore, the number of cells in each subspace may be the same or different. A plurality of cells 5 may be arranged (stacked) in a column in each of the subspace. For this reason, a pouch cell may be employed, so that the cells can be easily arranged in a column. As compared to cylindrical cells, pouch cells used in this embodiment have higher Ah rating, and high energy density due to better packaging efficiency. The pouch cell may be provided with a polymer coated aluminum foil packaging and two thin foil tabs which could be electrically connected to other element by crimping.

The thermal isolation panels 4 may be made of a suitable fire-resistant insulating material. In a preferred embodiment of the present disclosure, the thermal isolation panel 4 comprises zirconia foam interior and graphite exterior, so as to take advantages of its chemical inertness, high melting point, low thermal expansion coefficient and other property, and meet the thermal insulation requirement in a complex environment in a battery, thereby preventing the energy of a battery pack located at one side from spreading to the battery pack located at another side in the thermal runaway events.

Figure 2:
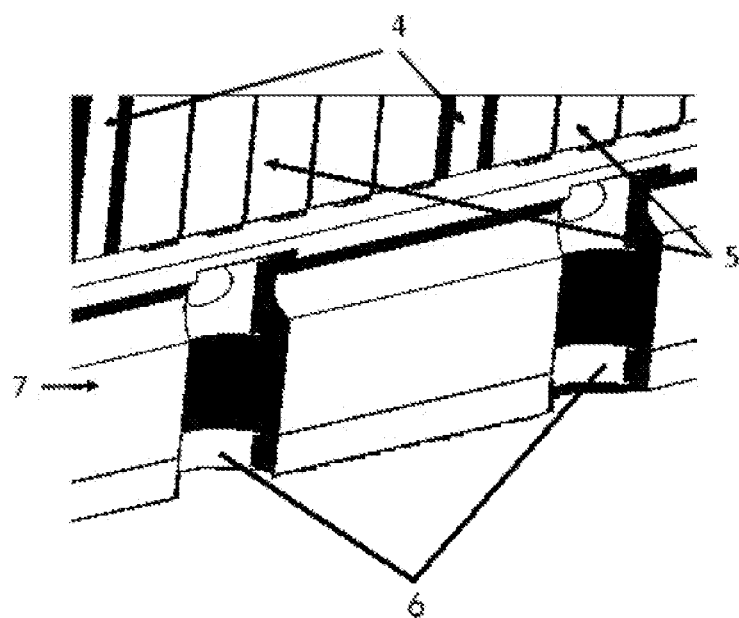
FIG. 2 illustrates a partial cross-sectional view of the battery of FIG. 1, it shows a weakened zone of a preferred structure.

As shown in FIG. 2, in the battery of the present disclosure, a weakened zone 6 is formed on an enclosure wall of the battery enclosure 7 adjacent to the cell 5, and the weakened zone 6 can guide the energy release of the cell 5 when a thermal runaway occurs. Therefore, when a thermal runaway event occurs in a group of cells in the battery, the thermal isolation panel 4 can prevent energy generated by the thermal runaway from being propagating to an adjacent battery pack in the battery; in the meanwhile, the weakened zone 6 on the battery enclosure 7 provides an optimal exhaust direction for the group of cells, and guides the energy of the cells in the thermal runaway to be directed away from the adjacent cells, such that the rapid spreading of the thermal runaway is prevented. By properly arranging the location of the weakened zone 6, fires and hot gases generated by thermal runaway can be directed away from other battery components and passengers/users, thereby improving safety the battery in powered devices such as electric vehicles.

The cells 5 may take different arrangement modes in the battery enclosure 7 depending on the different type of battery or the like. FIG. 1 illustrates a plurality of cells 5 arranged in a column, the battery enclosure 7 may have enclosure walls in other directions in addition to the enclosure walls in a vertical plane on the left and right sides. The weakened zone 6 in the present disclosure should be formed on the enclosure wall directly adjacent to the cells 5, e.g. formed on the enclosure wall parallel to the arrangement direction of the cells 5, and located at the part of the enclosure wall extending between two adjacent insulating plates 4.

In FIG. 1, weakened zones may be formed on left and right enclosure walls of the battery enclosure 7, respectively, such that the energy of the cells is discharged from the left and right sides upon thermal runaway. In a preferred embodiment, the weakened zones 6 are formed at the portions of the individual enclosure wall corresponding to each group of cells 5, and the respective weakened zones 6 are merely formed on enclosure walls on the same side of the battery enclosure 7 so as to facilitate the manufacturing process.

Providing a weakened zone 6 on the battery enclosure 7 may reduce the protective effect of the battery enclosure 7 on the cells 5 therein to some extent. For example, when the weakened zone 6 is formed as a vent channel which penetrates the external environment and the receiving space of the battery enclosure 7, the moisture in the external environment may enter the receiving space via the vent channel and contact with the cell 5, thereby affecting reliability of the battery. Therefore, the weakened zone 6 may be provided in a non-communicating structure, i.e., without exposing the receiving space (and the cell therein) to the external environment.

For this purpose, the weakened zone may be formed by reducing the thickness of the enclosure wall relative to the rest part of the enclosure wall. That is, the weakened zone of the enclosure wall is the portion having a smaller wall thickness relative to other portion of the enclosure wall. For instance, a blind hole is formed in the wall thickness direction in the enclosure wall of the battery enclosure 7, a depth of the blind hole is exactly the reduced wall thickness of the weakened zone relative to other portion of the enclosure wall. In addition, the blind hole can serve as a vent path for energy release in the thermal runaway events.

In the thermal runaway event, the cell discharges energy outwards through the weakened zone 6, and harmful gases are emitted as well. The vent channel formed by the weakened zone may be filled with a filter material, such as activated carbon particles, thereby producing a purifying effect and reducing pollution to the surrounding environment when the harmful gases are discharged via the vent channel.

The battery provided by the present disclosure may be a lithium ion battery pack.

On the basis, the present disclosure further provides a battery enclosure used in the battery. In addition, the battery of the present disclosure can be applied in the vehicles such as electric vehicles (EVs) and hybrid electric vehicles (HEVs), and exhibit high safety and reliability.

The above content describes the preferred embodiments of the present disclosure in detail with reference to the accompanying drawings, but the present disclosure is not limited thereto. A variety of simple modifications can be made in regard to the technical solutions of the present disclosure within the scope of the technical concept of the present disclosure, including a combination of individual specific technical features in any suitable manner. For the sake of avoiding the unnecessary repetition, a variety of possible combination modes are not further formulated in the present disclosure. However, such simple modifications and combinations thereof shall also be regarded as the content disclosed by the present disclosure, each of them falls into the protection scope of the present disclosure.

The invention claimed is:

1. A battery, comprising:
    a battery enclosure defining a receiving space;
    a thermal isolation panel disposed in the receiving space and dividing the receiving space into a plurality of subspaces; and
    a plurality of cells respectively arranged in the subspaces and divided into a plurality of groups by the thermal isolation panel,
    wherein a weakened zone for guiding energy release when thermal runaway occurs in the cells is formed on an enclosure wall of the battery enclosure adjacent to the cells, and
    wherein the thermal isolation panel comprises a zirconia foam interior and a graphite exterior.

2. The battery of claim 1, wherein a plurality of the cells are arranged in a column in each of the subspaces, the weakened zone is formed on the enclosure wall of the battery enclosure parallel to an arrangement direction of the cells.

3. The battery of claim 2, wherein a plurality of weakened zones corresponding to each group of the cells are only formed on one enclosure wall.

4. The battery of claim 1, wherein the weakened zone is arranged such that the receiving space is not exposed to the external environment.

5. The battery of claim 4, wherein the weakened zone is formed by arranging the enclosure wall with a portion having a smaller wall thickness relative to other portions of the enclosure wall.

6. The battery of claim 1, wherein the weakened zone is formed with a vent channel which is filled with activated carbon particles.

7. The battery of claim 1, wherein the cells are pouch battery cells.

8. A battery enclosure, wherein the battery enclosure is the battery enclosure in the battery of claim 1.

9. A vehicle, wherein the vehicle comprises the battery according to claim 1.

* * * * *